Dec. 29, 1970   A. R. PFAFF, JR   3,550,479
METHOD FOR MAKING CYLINDRICAL DIES
Filed Aug. 14, 1968   2 Sheets-Sheet 1
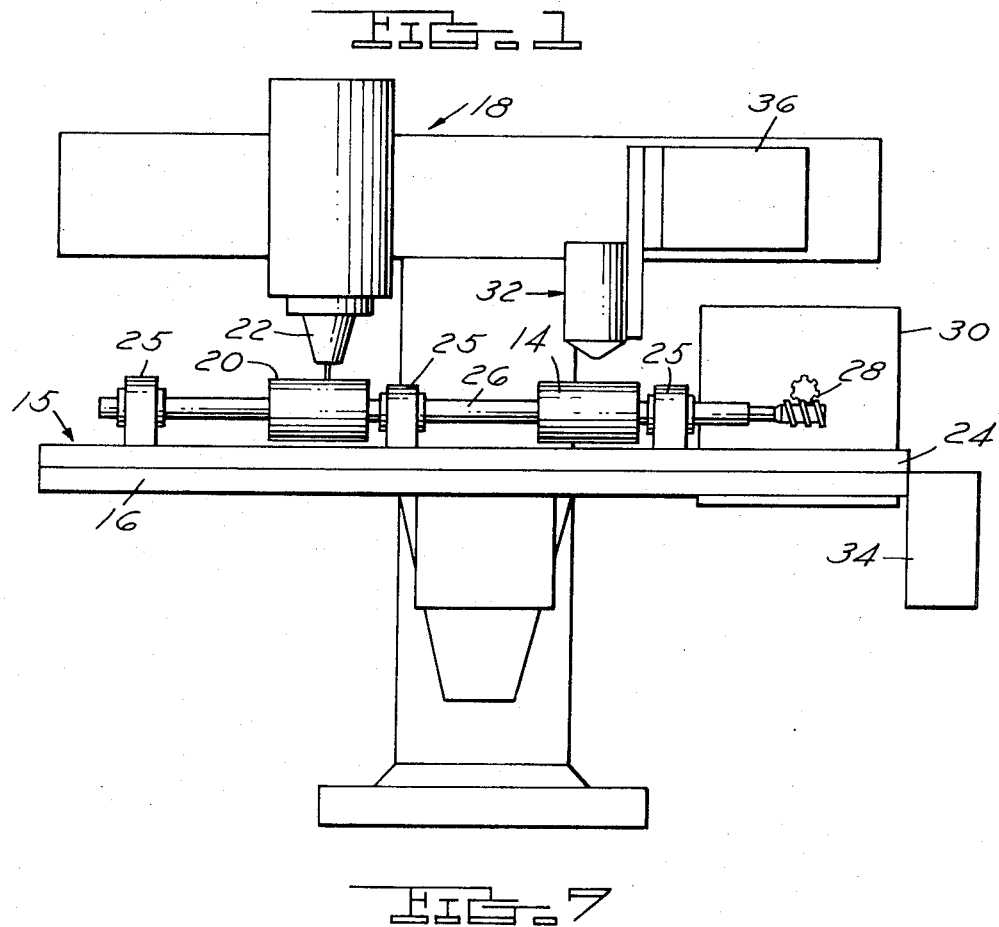
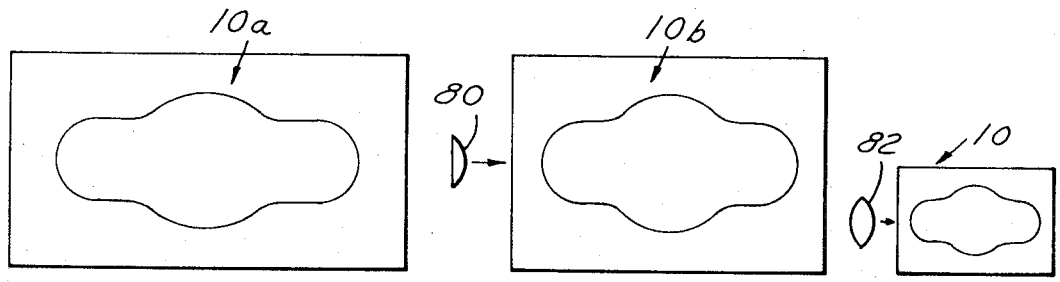
INVENTOR
ALAN R. PFAFF, JR.
BY
ATTORNEYS Dec. 29, 1970   A. R. PFAFF, JR   3,550,479
METHOD FOR MAKING CYLINDRICAL DIES
Filed Aug. 14, 1968   2 Sheets-Sheet 2
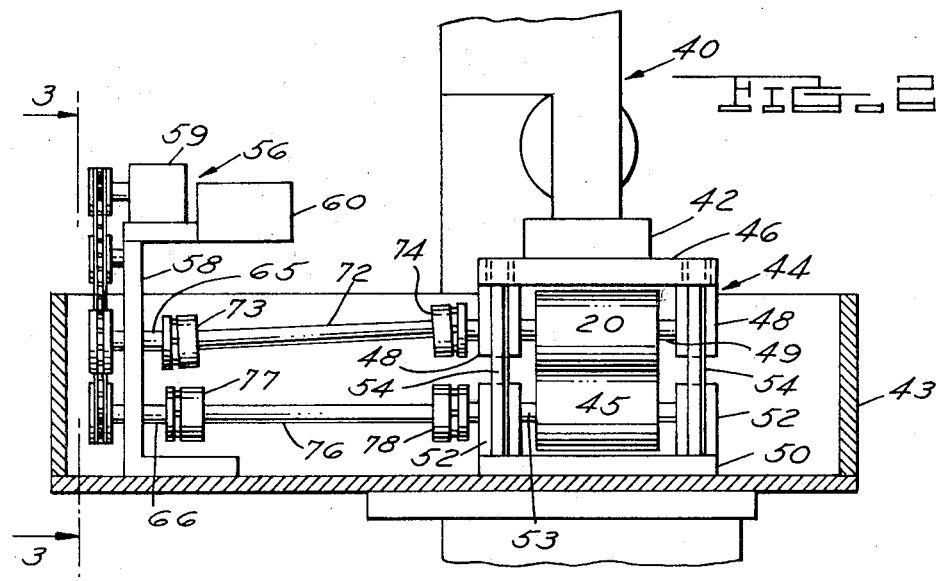
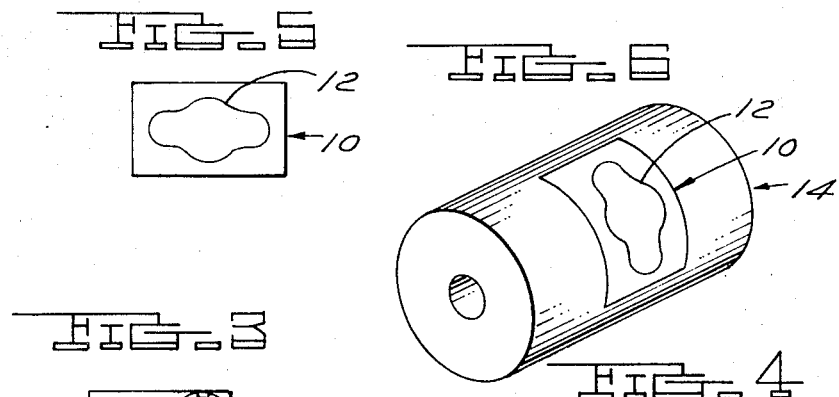
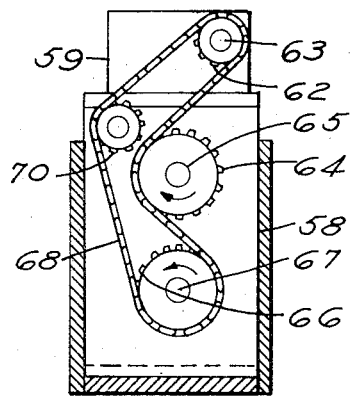
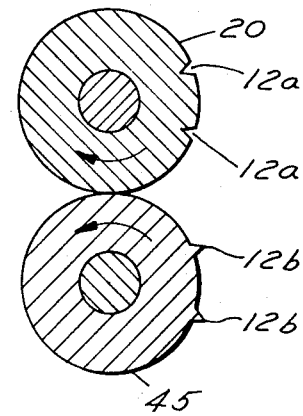
INVENTOR
ALAN R. PFAFF, JR.
BY
*Farley, Forster & Farley*
ATTORNEYS United States Patent Office 3,550,479
Patented Dec. 29, 1970

3,550,479
METHOD FOR MAKING CYLINDRICAL DIES
Alan R. Pfaff, Jr., Orchard Lake, Mich., assignor to Bernal Incorporated, a corporation of Michigan
Filed Aug. 14, 1968, Ser. No. 752,612
Int. Cl. B21k 5/20
U.S. Cl. 76—107                                            7 Claims

ABSTRACT OF THE DISCLOSURE

A cylindrical cutting die is made by mounting a line drawing of the pattern to be cut on a copy cylinder supported on the table of a milling machine for rotary movement in unison with a negative cylinder. A scanning device senses the pattern on the copy cylinder and coordinates rotary movement of the cylinders and linear movement of the machine table to causes a cutter mounted on the machine spindle to form a grooved reproduction of the pattern on the negative cylinder, which is then used in an electrical discharge machine, equipped with a fixture for rotatably supporting the negative cylinder on the machine head in axially parallel relation with a die blank cylinder in the machine tank and for rotating the cylinders at equal rotational speed, to cause a raised cutting pattern to be machined on the die cylinder corresponding to the grooved reproduction on the negative cylinder.

BACKGROUND OF THE INVENTION

(1) Field of the invention

This invention relates to an improved method and apparatus for making a cylindrical cutting die from a precision layout of the desired cutting pattern, which may for example be for some type of gasket having a non-geometric shape.

(2) Description of the prior art

Most cutting dies are of the plate type, the cutting operation being performed by reciprocating die movement. The rolling cutting action of a cylindrical die has obvious advantages over the stamping action of a plate type die, but it has not been practically possible to produce the cylindrical form of die with the required degree of precision and hardness, particularly where the cutting edge pattern is a nongeometrical one.

SUMMARY OF THE INVENTION

In a broad sense, the invention provides a method and apparatus for converting a configuration drawn in a flat plane to a cylindrical plane without making mathematical adjustments. This conversion is utilized for machining a cylindrical electrode which in turn is used to produce a cylindrical cutting die or other tool requiring the application of a machined surface to the periphery of a cylinder.

As applied to the manufacture of a cylindrical cutting die, the method of the invention involves the steps of making a precision line layout of the cutting edge portion of the die, mounting this layout on the peripheral surface of a copy cylinder, machining a groove on the peripheral surface of a negative cylinder conforming to the cutting edge portion of the layout, and forming the cutting edge on a cylindrical die blank by rotating the negative cylinder and die blank on parallel axes at equal rotational speed in the tank of an electrical discharge machine.

This method may include the additional step of photographically reproducing the precision layout prior to mounting the same on the copy cylinder in order to adjust the scale of the layout in accordance with the relative diameters of the copy cylinder and the negative cylinder; and, this step of reproducing may be carried out with a cylindrical lens in order to adjust the scale only in the direction circumferentially of the copy cylinder.

Apparatus for carrying out the method preferably comprises the combination of a milling machine having a spindle equipped with a groove forming tool, a work supporting table having a fixture mounted thereon for supporting the copy and negative cylinders for rotary movement, and drive means for moving the machine table linearly in a direction transverse to the spindle axis and also for rotating the copy and negative cylinders in unison independently of the linear table movement. The linear table movement and rotary movement of the cylinders are coordinated as ordinate and abscissa. Drive control means, including a device for scanning the layout mounted on the copy cylinder, is operable to synchronize linear table movement and rotary movement of the cylinders and form a grooved reproduction of the layout pattern on the peripheral surface of the negative cylinders.

A fixture is provided for an electrical discharge machine, which has a head and a tank, the fixture including a head-mounted member rotatably supporting a formed negative cylinder, a tank-mounted member rotatably supporting a die blank cylinder in axially parallel relation with the formed negative cylinder, and means for rotating the formed negative and die blank cylinders at equal rotational speed to machine a raised cutting pattern on the die blank cylinder corresponding to the grooved reproduction on the negative cylinder. Electrical discharge machining (EDM) permits the use of a hardened steel die blank cylinder and forms a precise reproduction of the master layout, the precision being limited only by the accuracy of the scanning and control mechanism and the accuracy of the fixtures in which the various steps of the process are performed.

Other features and advantages of the invention will appear from the description to follow the method and apparatus illustrated in the accompanying drawings.

DESCRIPTION OF THE DRAWING

FIG. 1 is a schematic elevation of a milling machine for making a negative electrode cylinder from a line layout mounted on a copy cylinder;

FIG. 2 is a schematic elevation of the tank and head of an (EDM) electrical discharge machine showing a fixture used for machining a cylindrical work piece from the negative electrode cylinder;

FIG. 3 is an elevational taken as indicated by the line 3—3 of FIG. 2;

FIG. 4 is an enlarged sectional elevation through the negative electrode and work piece cylinders in the apparatus of FIG. 3;

FIG. 5 is a representative master layout;

FIG. 6 illustrates a copy cylinder with the layout of FIG. 6 mounted on the periphery thereof; and FIG. 7 illustrates the steps which may be employed in making the master layout of FIG. 5.

DESCRIPTION OF THE PREFERRED EMBODIMENTS

The drawings illustrates the application of the invention to the manufacture of a cylindrical cutting die. FIG. 5 shows the first step involved in this manufacture—the preparation of a precision line layout of the desired shape or pattern of the cutting edge, the shape shown having an edge 12 of irregular form such as might be required for some type of gasket.

The layout 10 is then wrapped around the periphery of a copy cylinder 14, as shown in FIG. 6, and is secured in place.

This copy cylinder 14 is mounted on a fixture 15, FIG. 1, secured to the table 16 of a milling machine 18 together with a negative electrode cylinder 20, hereinafter referred to simply as a "negative cylinder." This negative cylinder is the workpiece in this stage of the process, is made of carbon or other suitable electrode material, and is mounted under the spindle 22 of the machine. The fixture 15 includes a base member 24 supporting bearings 25 for a shaft 26 on which the copy and negative cylinders 14 and 20 are mounted; and, the shaft 26 is connected by gearing 28 to a motor 30 so as to be rotated thereby. The copy cylinder 14 is positioned beneath a tracing or scanning device 32 capable of sensing the configuration of the pattern 12 on the layout 10.

The motor 30 forms part of drive means for moving the copy and negative cylinders 14 and 20 relative to the scanning device and spindle 32 and 22 respectively, the other part of the drive means comprising a conventional table drive motor 34 which moves the machine table 16 linearly in a direction transverse to the axis of the spindle 22. In this arrangement the rotary movement of the cylinders 14 and 20 produced by the motor 30 and the linear movement of the table 16 produced by the motor 34 are coordinated as ordinate and abscissa, rotary movement corresponding to movement in the Y axis and linear movement in the X axis.

The scanning device 32, which is preferably a known optical type of unit, forms part of a drive control means 36 for synchronizing operation of the motors 30 and 34 to scan the pattern 12 and cause a grooved reproduction thereof to be machined on the peripheral surface of the negative cylinder 20, as illustrated by the grooves 12a in the sectional view of the cylinder 20, FIG. 4.

FIG. 2 illustrates a conventional type of EDM machine 40 having a head 42 and a tank 43. A fixture 44 is provided for mounting a formed negative cylinder 20 and a die blank cylinder 45 in axially parallel relation to each other. This fixture 44 has a member 46 suitably secured to the head 42 of the machine and carrying bearings 48 for a shaft 49 on which the negative cylinder 20 is placed for rotation therewith. A second member 50, mounted in the tank 43, carries bearings 52 for a shaft 53 on which the die blank cylinder 45 is placed; and, guide rods 54 secured to the member 50 slidably engage the head mounted member 46 to maintain the parallel relation between the shafts 53 and 49 as the member 46 is moved by the head of the machine during the EDM operation.

Drive means 56 rotate the shafts 49 and 53 and cylinders 20 and 45 mounted respectively thereon at equal rotational speeds, and include a support 58 on which a motor 59 and motor speed control unit 60 are mounted. As best shown in FIG. 3, a sprocket 62 on the output shaft 63 of the motor 59 drives a sprocket 64 secured to a shaft 65 and oppositely drives a sprocket 66 secured to a shaft 67 through a precision chain 68, properly tensioned by an idler sprocket 70. The shaft 49 on which the negative cylinder 20 is mounted is driven from the shaft 65 through a connecting shaft 72 and flexible couplings 73 and 74 of a known type which permit minimal rotational backlash, and a similar connecting shaft 76 and flexible couplings 77 and 78 drives the die blank cylinder shaft 53 from the drive shaft 67.

As the EDM machine 40 is operated, the negative cylinder 20 and die blank cylinder 45 are oppositely rotated at equal rotational speed by the motor 59 to machine a raised cutting pattern on the die blank cylinder 45 corresponding to the grooved reproduction on the negative cylinder 20, as shown by the cutting edges 12b formed on the cylinder 45, FIG. 4.

The negative cylinder 20 is preferably made of carbon, of relatively small grain, which results in fine detail in the EDM operation, and the formation of cutting edges 12b which are precise and sharp.

The die blank cylinder 45 is preferably completely hardened prior to the EDM machining operation, and has a diameter equal to the diameter of the negative cylinder 20 minus two times the depth of the groove 12a formed therein. Actually the diameter of the negative cylinder 20 must be determined in accordance with the final diameter desired for the cylindrical die. For example, if the die 45 is to have a diameter from cutting edge to cutting edge of four inches and the depth of a cutting edge 12b is one-sixteenth inch, the negative cylinder 20 must have a diameter of 4.125 inches.

In the operation of machining the negative cylinder illustrated in FIG. 1, the copy cylinder 14 and negative cylinder 20 are shown as being of equal diameter. This may not always be the case. In some instances, it will be desirable to use a copy cylinder 14 of larger diameter than the negative cylinder 20 in order to obtain a mechanical pantograph effect for increased accuracy. It also may be desirable to adjust the scale of the layout 10 in order to use an existing copy cylinder rather than make a new one having the exact diameter required. FIG. 7 diagrammatically illustrates the steps which may be involved in making the master layout 10 shown in FIG. 5.

An original layout 10a is drawn, preferably on an enlarged scale in order to facilitate the drawing operation and to reduce the effect of any inaccuracies that may occur in this operation. If any adjustment in scale is necessary in order to compensate for the relative diameters of the copy cylinder 14 and negative cylinder 20, this is accomplished by photographically reducing the original layout 10a in one direction, using a cylindrical lens 80 to produce the enlarged layout 10b. By comparing FIGS. 6 and 7 it can be seen that the reduction in scale of the layout 10b is in the direction circumferentially of the copy cylinder 14, which direction corresponds to the Y axis when the copy cylinder is mounted on the machine in the manner illustrated in FIG. 1. The last step is to reduce the layout 10b in both directions using a conventional photographic lens 82, to produce the master layout 10 which is mounted on the copy cylinder 14.

While the method and apparatus of the invention have been illustrated and described with relation to the manufacture of cylindrical cutting dies, it is obvious that the invention is applicable to the forming of other configurations on a cylindrical surface.

I claim:
1. The method of forming a configuration on a cylindrical surface which consists in the steps of:
   machining a negative reproduction of the configuration on the surface of an electrode cylinder; and
   forming the configuration on a cylindrical work piece by rotating the negative electrode and work piece cylinders on parallel axes at equal rotational speed in the tank of an electrical discharge machine.

2. The method set forth in claim 1 wherein the step of machining a negative reproduction of the configuration is preceded by the steps of:
   making a master layout of the configuration to be formed; and
   mounting the layout on the peripheral surface of a copy cylinder.

3. The method set forth in claim 1 wherein the work piece cylinder is hardened prior to said forming step.

4. The method set forth in claim 2 further consisting of the step of photographically reproducing the layout prior to the step of mounting on the copy cylinder to adjust the scale of the master layout in accordance with the relative diameters of the copy cylinder and the negative electrode cylinder.

5. The method set forth in claim 3 wherein the step of reproducing is carried out with a cylindrical lens to adjust the scale only in the direction circumferentially of the copy cylinder.

6. The method set forth in claim 1 wherein the configuration is that of the cutting edge of a die and the machining of the negative reproduction is carried out to form a groove on the electrode cylinder conforming to the cutting edge.

7. The method set forth in claim 1 further including the step of making the work piece cylinder prior to said forming step with a diameter equal to the diameter of the negative electrode cylinder minus twice the maximum depth of the negative reproduction of the configuration machined thereon.

References Cited

UNITED STATES PATENTS

| | | | |
|---|---|---|---|
| 3,198,109 | 8/1965 | Dwyer et al. | 76—107X |
| 3,240,913 | 3/1966 | Hill et al. | 76—107X |
| 3,341,329 | 9/1967 | Blake | 76—107X |

BERNARD STICKNEY, Primary Examiner

U.S. Cl. X.R.

29—33; 219—69